United States Patent [19]

Dean et al.

[11] 4,131,252
[45] Dec. 26, 1978

[54] APPARATUS FOR COMPENSATING FOR AIRFLOW BLOCKAGE IN AIRCRAFT SLOTTED FLAP ASSEMBLIES

[75] Inventors: Roy D. Dean; Richard H. Weiland, both of Seattle, Wash.

[73] Assignee: The Boeing Company, Seattle, Wash.

[21] Appl. No.: 821,530

[22] Filed: Aug. 3, 1977

Related U.S. Application Data

[63] Continuation of Ser. No. 696,398, Jun. 15, 1976, abandoned.

[51] Int. Cl.$^2$ .............................................. B64C 9/02
[52] U.S. Cl. ................................... 244/212; 244/130; 244/215
[58] Field of Search ............... 244/212, 213, 215, 216, 244/204, 130, 53 R

[56] References Cited

U.S. PATENT DOCUMENTS

| | | | |
|---|---|---|---|
| 2,158,676 | 5/1939 | Englehardt | 244/216 |
| 2,620,147 | 12/1952 | Butler et al. | 244/216 |
| 3,145,950 | 8/1964 | Circeni | 244/216 |
| 3,199,813 | 8/1965 | Roper | 244/130 |
| 3,478,988 | 11/1969 | Roed | 244/212 |
| 3,806,067 | 4/1974 | Kutney | 244/53 R |
| 4,007,896 | 2/1977 | Reynolds | 244/215 |

FOREIGN PATENT DOCUMENTS

| | | | |
|---|---|---|---|
| 665964 | 9/1938 | Fed. Rep. of Germany | 244/215 |
| 931250 | 2/1948 | France | 244/216 |
| 1010419 | 6/1952 | France | 244/204 |

OTHER PUBLICATIONS

Van Den Bussche, Published U.S. S.N. 235,640, May 25, 1943.

Primary Examiner—Galen L. Barefoot
Attorney, Agent, or Firm—Christensen, O'Connor, Johnson & Kindness

[57] ABSTRACT

Apparatus to compensate for airflow blockage and attendant airflow separation, loss of lift, and flap buffeting caused by the support members connecting a flap to the stationary portion of the wing is disclosed. An airflow duct, located between the lower and upper surfaces of the flap, is dimensioned and positioned such that when the flap is extended, air flowing through the airflow duct is discharged over the blocked portion of the upper flap surface. A recessed airflow channel, formed in the upper surface of the flap to direct additional airflow over the blocked region, is included for use in situations in which the flap structure precludes an airflow duct of sufficient size to fully compensate for the airflow blockage. Duct closure doors are included to seal the airflow duct inlet opening when the flaps are retracted to thereby reduce drag during operation of the aircraft in the cruise regime. The duct closure doors include a configuration in which the closure door forms a portion of the airflow duct wall when the flap is extended and a configuration in which the closure door is arranged to fold about a portion of a flap actuation mechanism that would physically interfere with the operation of a conventionally configured duct closure door.

16 Claims, 11 Drawing Figures

APPARATUS FOR COMPENSATING FOR AIRFLOW BLOCKAGE IN AIRCRAFT SLOTTED FLAP ASSEMBLIES

This is a continuation of application Ser. No. 696,398 filed June 15, 1976, now abandoned.

BACKGROUND OF THE INVENTION

This invention relates to airplane slotted flap arrangements. More particularly, this invention relates to means for compensating for airflow blockage that is created by the support members attaching a flap to the trailing edge of an airplane wing.

The use of flaps located on the trailing edge of an airplane wing to vary wing lift characteristics during various flight phases is well known. In the so-called single slotted flap arrangement, a wing flap is extended relative to the stationary wing of the aircraft so that a spanwise slot is formed between the trailing edge of the wing and the leading edge of the flap. This slot directs airflow from below the wing and the flap for subsequent discharge across the upper surface of the flap in the direction of and substantially parallel to the air normally flowing over the upper surface of the flap.

Many mechanisms are known in the art for attaching the flap to the airplane wing and for providing flap translation and rotation during take-off and landing procedures to thereby control the effective lift of the composite wing-flap airfoil. Generally speaking, these support members and actuation means prevent the flap from achieving ideal performance, since the supports and actuators often block the airflow through at least a portion of the slot. Partially blocking the airflow through the slot often creates regions along the upper surface of the flap in which the airflow separates from the upper flap surface with attendant loss of lift, increased drag and flap buffeting. This problem is especially significant in airplane configurations that require a plurality of flap support members spaced spanwise along the flap for connecting the flap assembly to the stationary wing structure.

Accordingly, it is an object of this invention to provide a slotted flap arrangement that minimizes the airflow blockage caused by flap support members and drive mechanisms located within the slotted region.

It is another object of this invention to compensate for airflow blockage caused by the flap support members of a slotted flap arrangement.

It is still another object of this invention to increase the efficiency of a slotted flap arrangement having flap support members connecting the flap to the aircraft wing.

It is yet another object of this invention to provide the foregoing objectives without the use of an external power source.

SUMMARY OF THE INVENTION

The foregoing and other objects are achieved in accordance with this invention by structurally arranging portions of the flap that are contiguous to airflow blocking support members so as to provide additional airflow over predetermined portions of the upper flap surface. In each embodiment of this invention, an airflow duct is formed from the lower surface of the flap to the upper flap surface. Airflow through this duct combines with airflow passing through the slot that is formed between the wing and the extended flap to energize the boundary layer of air adjacent and aft of the support members and to combine with the turbulent airflow created by the support members to cause the total airflow across the upper surface of the flap to reattach to the flap thereby providing performance approaching that of a flap having no airflow blockage within the slotted region. One embodiment of the invention, which is applicable in airplane configurations including a first recessed region in the upper surface of the flap for receiving or containing the flap support member when the flap is retracted, includes an airflow duct between the upper and lower flap surfaces and an airflow channel formed by a second recessed region in the upper surface of the flap that is substantially parallel to and contiguous with the first recessed region. The sidewalls of the first recessed region and the sidewalls of the airflow channel are contoured to provide an aerodynamically smooth surface that directs substantially laminar airflow toward and over the upper flap surface to compensate for slot blockage normally caused by the support member. In a preferred embodiment, a relatively flat cove panel, hinged to and rotatable about the wing trailing edge, is oriented and dimensioned to form an upper covering surface over the airflow channel when the flap is in the retracted position such that the upper flap surface is effectively a single aerodynamically smooth surface. When the flap is in the extended position, the aft edge portion of the cove panel swings downwardly to control the cross-sectional area of a slot formed between the lower boundary surface of the airflow channel and the wing trailing edge.

Other embodiments of this invention also include closure doors for sealing the air inlet of the airflow duct when the flap is in the retracted or cruise position to thereby reduce or eliminate drag. In one embodiment of the invention, a closure door seals the duct air inlet when the flap is retracted and forms a portion of the upper duct wall when the flap is extended. In another embodiment in which the airflow duct is located adjacent to a flap support member with a rotary actuator that is mounted on the flap support member extending over that portion of the flap which includes the airflow duct, the closure door comprises a series of hinged panels. These hinged panels form a portion of the upper flap surfaces and a portion of the airflow duct wall when the flap is extended and fold about the rotary actuator when the flap is retracted. In addition, this embodiment also includes a rotatable sidewall door that forms one sidewall of the airflow duct when the flap is extended and rotates into the interior region of the flap as the flap is retracted to provide clearance for the rotary actuator.

DETAILED DESCRIPTION

Figure 1:
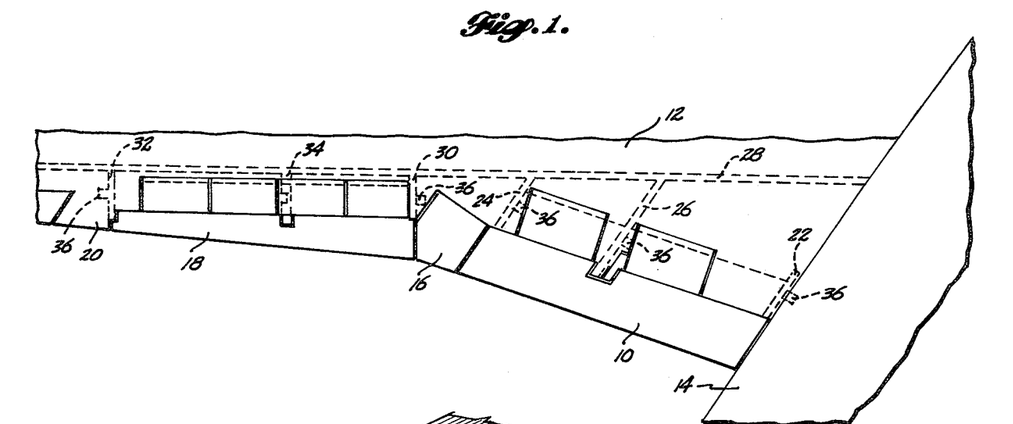
FIG. 1 depicts a fragmented plan view of an airplane that illustrates a wing and trailing edge flap arrangement that can advantageously employ this invention.

FIG. 1 depicts a typical airplane wing and trailing edge flap arrangement that can advantageously employ this invention. In FIG. 1, an inboard flap 10 extends spanwise along the trailing edge of a wing 12 between an airplane fuselage section 14 and an inboard aileron 16. An outboard flap 18 extends along the trailing edge of the wing 12 between the inboard aileron 16 and an outboard aileron 20. The inboard flap 10 is affixed to the trailing edge of the wing 12 by an inboard support member 22, an outboard support member 24 and a center support member 26. The inboard support member 22 of the inboard flap 10 is rigidly attached to the airplane fuselage section 14 and both the outboard support member 24 and the center support member 26 are rigidly attached to the rear spar 28 of wing 12. In a similar fashion, the outboard flap 18 is affixed to the wing 12 by an inboard support member 30, an outboard support member 32 and a center support member 34 with the support members 30, 32 and 34 connected to the rear spar 28 of the wing 12. A rotary actuator 36 is mounted on each flap support member to drive the associated flap between the retracted and extended positions. For example, in FIG. 2, a rotary actuator 36 is attached to one end of a drive arm 38 that is supported in a bearing (not shown in FIG. 2) in a flap support member 44 at a point near the trailing edge of the wing 12. The other end of the drive arm 38 is pivotably attached to a flap attachment link 46 by conventional attachment means such as a drive pin. One end of a support link 40 is pivotably attached to the rearmost end of the support member 44, with the second end of the support link 40 being pivotably attached to the flap attachment link 46 at a point between the trailing edge and the leading edge of the flap 10. The attachment points and the length of the drive arm 38 and the support link 40 are arranged such that the flap 10 translates rearwardly and the trailing edge of the flap 10 rotates downwardly as the rotary actuator 36 is activated to extend to flap 10.

Figure 2:
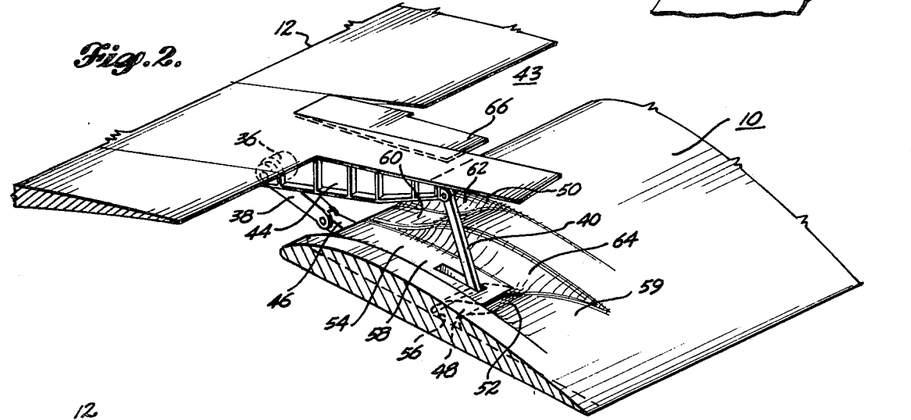
FIG. 2 is an isometric view of a wing and trailing edge flap arrangement that incorporates one embodiment of this invention.

As the flap 10 is extended, an airflow slot 43 is formed between the lower surface of the wing 12 and the upper surface or the leading edge of the flap 10. In the arrangement of FIG. 2, the flap support structure including the flap support member 44, the drive arm 38 and the support link 40 blocks airflow over that portion of the upper surface of the flap 10 that is immediately downstream from the support structure. This airflow blockage causes separation of the airflow from the upper surface of the flap 10 to not only reduce the lift provided by the extended flap 10, but also create areas of turbulence that cause increased drag and buffeting of the flap 10.

The embodiment of this invention depicted in FIG. 2 includes an airflow duct 48 and an airflow channel 50 that are configured to conduct airflow across the upper surface of the flap 10 to compensate for the airflow blockage caused by the flap support structure and thereby prevent the airflow separation, drag and buffeting problems that have beset the prior art. In FIG. 2, a recess 54 forms a channel in the upper surface of the flap 10 for receiving and containing the flap support member 44 when the flap is retracted. The recess 54 extends from the leading edge of the flap 10 toward the trailing edge thereof, having a width and length commensurate with the dimensions of the flap support structure.

The airflow duct 48 extends through the flap 10 from an exit opening 52 in the upper flap surface to an air inlet opening 56 located in the lower surface of the flap 10. The exit opening 52 of the airflow duct 48 is a generally rectangular orifice located aft of the connection between the support link 40 and the flap attachment member 46 with the exit opening located in, and generally extending across the width of the recess 54. Preferably, the cross-sectional area of the air inlet 56 of the airflow duct 48 is greater than the cross-sectional area of the exit opening 52 and the interior wall of the duct 48 is contoured to form an aerodynamically smooth flow duct between the air inlet 56 and the exit opening 52. The ratio of the area of the air inlet 56 to the area of the exit opening 52 is normally established to control the velocity and volume of the airflow emerging from the exit opening 52 and hence is one of the parameters that determine the amount of compensation provided by the airflow duct 48 for the airflow blockage caused by the support member 44. The location of the air inlet 52 on the lower surface of the flap 10 relative to the position of the exit opening 52 is also established to provide maximum compensation for the airflow blockage. To provide maximum compensation, air inlet 56 is generally substantially rectangular in shape and is located forward of the exit opening so that air flowing beneath the wing 12 and impinging on the lower surface of the flap 10 enters directly into the air inlet 56 when the flap 10 is in an extended position. Since various flight maneuvers require different flap extensions, the position and shape of the air inlet 56, as well as the contour of the duct wall region immediately adjacent to the air inlet 56, are established to provide satisfactory performance over the complete flap extension range.

In any case, with the flap 10 extended, air flowing through the airflow duct 48 exits across the portion of the flap upper surface that is blocked from receiving air flow from the slot 43 because of the drive arm 38, the support link 40 and the support member 44. As can be seen in FIG. 2, in the practice of this invention, the recess 54 extends rearwardly beyond the rearmost end of the support member 44 with the lower boundary 58 of the recess 54 forming a smooth rampway or incline 59 between the lower surface of the recess 54 and the upper surface of the flap 10. Air flowing from the exit opening 52 flows smoothly along the rampway 59 and continues to flow smoothly across the remaining portion of the upper surface of the flap 10.

In some situations, a sufficient volume of air cannot be made avilable through the duct 48 to satisfactorily compensate for the airflow blockage. Often such situations arise because internal flap structure such as ribs limit the cross-sectional geometry of the airflow duct 48 and the exit opening 52. In such situations, additional airflow compensation is provided in accordance with this invention by the airflow channel 50. The airflow channel 50 is formed as a recessed portion of the upper flap surface that extends substantially parallel with the direction of the airflow from the leading edge of flap 10 toward the flap trailing edge. In the embodiment of FIG. 2, the airflow channel 50 is contiguous to the recess 54 with the airflow channel 50 and the recess 54 effectively forming a single inwardly contoured or recessed portion in the upper surface of the flap 10. The depth of the airflow channel 50 is greatest along the leading edge of the flap 10, with the lower boundary surface 60 of the airflow channel 50 being contoured to rapidly converge into the upper surface of the flap 10. The sidewall 62 (formed at the boundary between the airflow channel 50 and the upper flap surface), the sidewall 64 (formed at the boundary between the airflow channel 50 and the recess 54), and the lower boundary 60 of the airflow channel 50 are each contoured to provide an aerodynamically smooth surface. That is, the sidewalls 62 and 64 are not vertical surfaces terminating in sharp edges at the upper surface of the flap 10, the lower boundary 58 of recess 54, and the lower boundary 60 of airflow channel 50, but are compound curved surfaces configured to form an aerodynamically smooth channel.

Cove panel 66 is a generally rectangular panel dimensioned and positioned adjacent to the support member 44 to cover the airflow channel 50 when the flap 10 is in the retracted position. The cove panel 66 is pivotably attached along the forward edge of the cove panel to the skin covering the wing 12 or other structure within the wing 12 by a hinge or similar device such that the trailing edge of the cove panel 66 swings downwardly as the flap 10 is extended.

Figure 3:
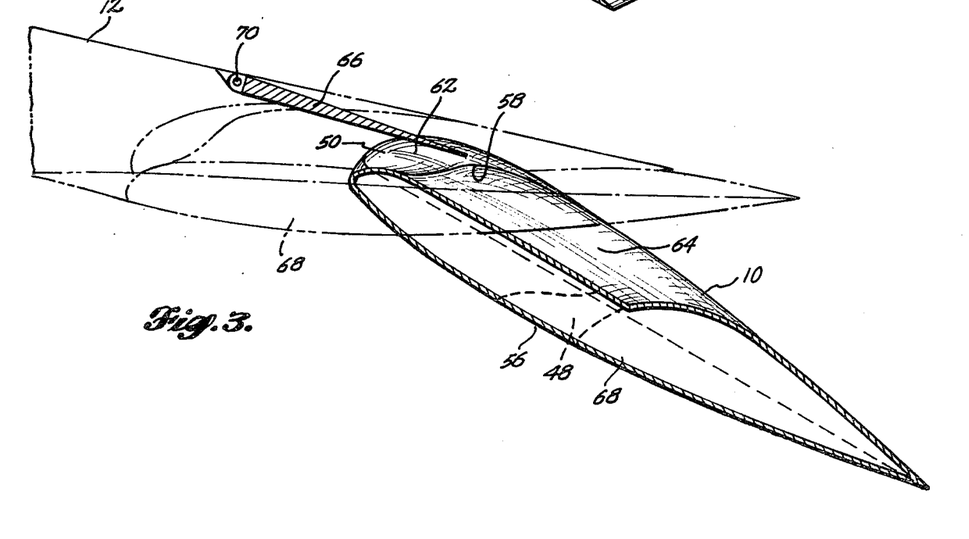
FIG. 3 is a cross-sectional chordwise view diagrammatically depicting the structural arrangement between the wing and flap of the embodiment of this invention depicted in FIG. 2 with the flap in the extended position and showing the flap in a retracted position in phantom outline.

FIG. 3, which depicts a cross-sectional view of the wing 12, the flap 10, the airflow channel 50, and the cove panel 66, illustrates the structural relationship between these elements when the flap is retracted and when the flap is extended. As shown by the phantom lines in FIG. 3, when the flap 10 is retracted, the flap 10, the wing 12 and the flap fairing 68 that covers or encloses the flap attachment member 46 of FIG. 2, effectively form an extension of the stationary wing 12 such that the wing 12 and the flap 10 define a single airfoil. As previously noted, the cove panel 66 covers the air channel 50 when the flap 10 is retracted to effectively provide a continuous aerodynamic upper surface over the wing 12.

When the flap 10 is extended, the trailing edge of the cove panel 66 swings downward about the rotational axis 70 with a portion of the lower surface of the cove panel 66 extending over the forward portion of the airflow channel 50. Since the cove panel 66 substantially extends across the full width of the airflow channel 50, the aft lower surface of the cove panel 66 and the adjacent portion of the lower boundary 58 of the airflow channel 50 effectively form a slot that regulates the flow of air through the airflow channel 50 and causes the air to flow smoothly through the airflow channel and across the upper surface of the flap 10.

Figure 4:
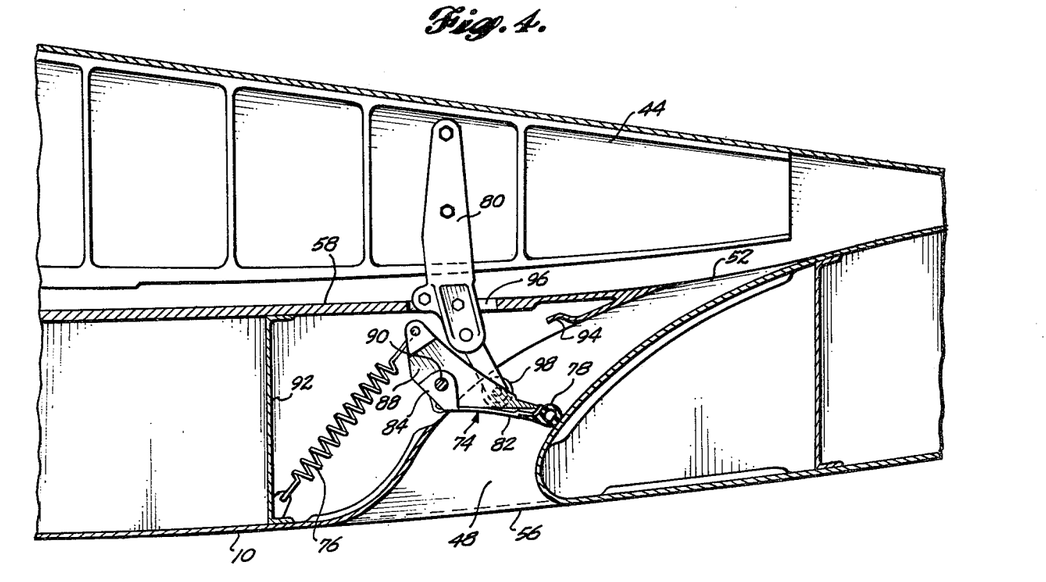
FIG. 4 is a cross-sectional side view of an airflow duct and a duct closure door in accordance with this invention that depicts the door actuation mechanism and the position of the door when the flap is retracted.
Figure 5:
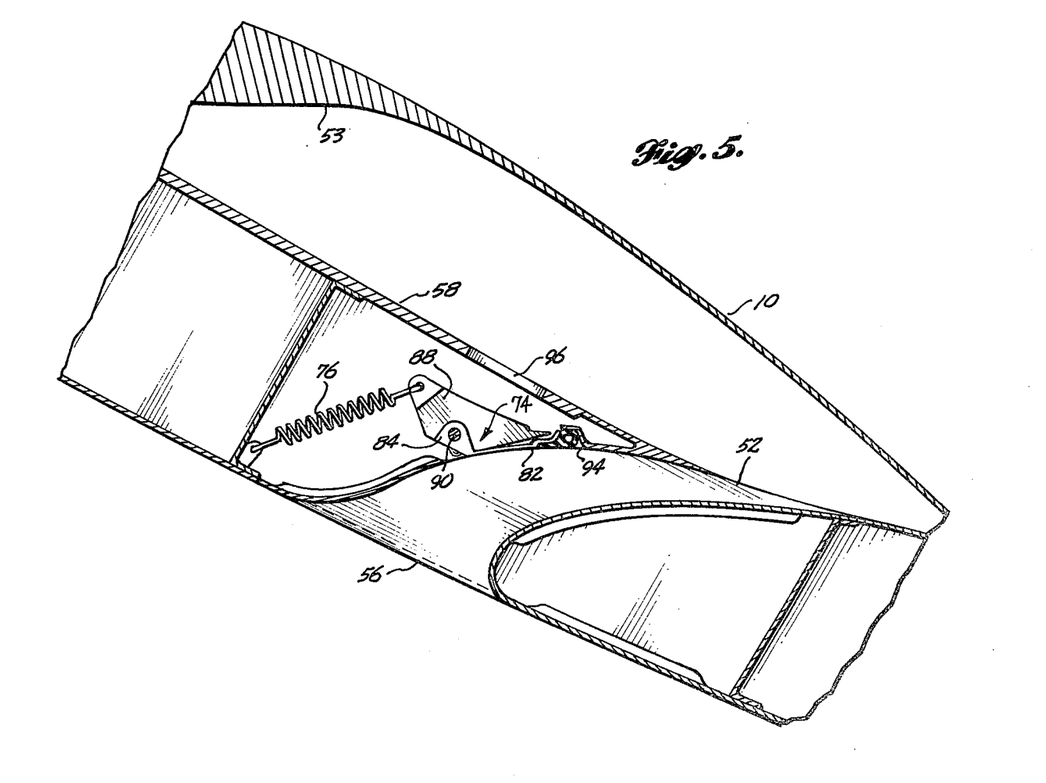
FIG. 5 is a cross-sectional side view of the airflow duct and duct closure door of FIG. 4 when the flap is extended.
Figure 6:
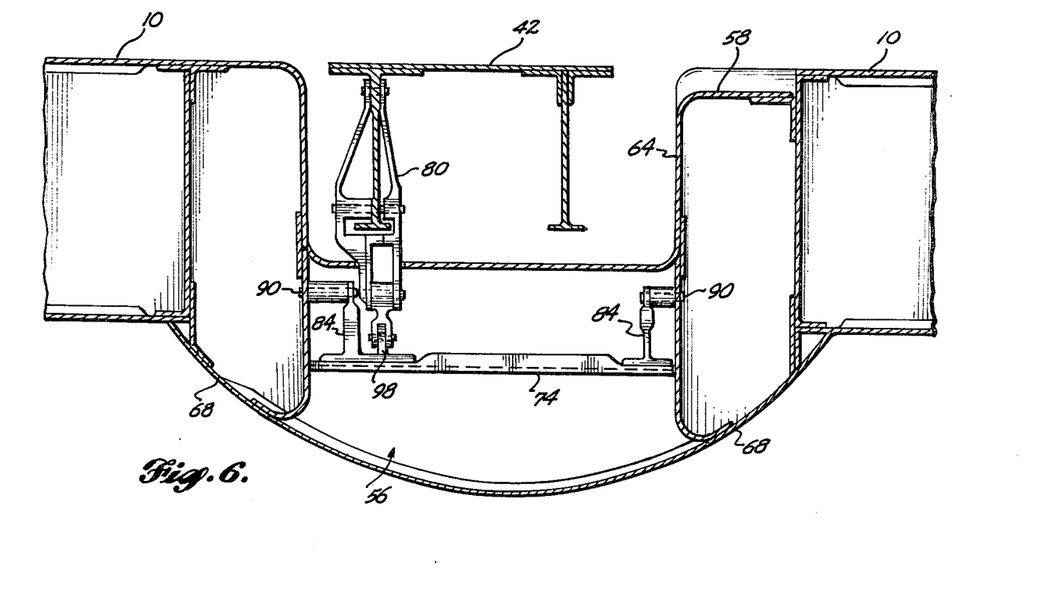
FIG. 6 is a cross-sectional rear view of the closure door and actuator mechanism of FIGS. 4 and 5.

As can be observed in FIG. 3, all the structural features of this invention except the air inlet 56 of airflow duct 48 are advantageously enclosed within the interior region of the composite airfoil formed by the wing 12 and the flap 10 when the flap is in the retracted position. Accordingly, it can be recognized that during cruise operation of the aircraft, i.e. flaps retracted, the air inlet 56 is the only structural feature of this invention that can detract from the aerodynamic efficiency of the wing-flap arrangement by causing an interruption in the laminar flow of air along the lower surface of the flap 10 to thereby cause drag. Thus, in the practice of this invention, it is often advantageous to close off or seal the air inlet 56 when the flap is retracted to maintain an unbroken or continuous airflow along the lower surface of the flap 10. A closure door assembly that closes the air inlet 56 when the flap 10 is retracted and automatically exposes the air inlet opening 56 when the flap is extended is depicted in FIGS. 4, 5, and 6. This closure door is arranged to form a portion of the duct wall of the airflow duct 48 when the flap 10 is in the extended position.

Referring to FIG. 4, which depicts the closure door assembly with the flap 10 retracted, the closure door is positioned to seal off the airflow duct 48 at a point above the airflow duct inlet opening 56. The closure door assembly basically includes a door panel 74, a retaining spring 76, a seal 78 mounted along the edge of the door panel 74 that contacts the wall of the airflow duct 48 and a closure arm 80 that holds the door in the closed position when the flap 10 is retracted.

The door panel 74 includes a duct sealing region 82 that is contoured to match the contour of duct wall 48 such that when flap 42 is extended and the closure door is open (FIG. 5), the duct sealing region forms a portion of the forward wall of the airflow duct 48. The door panel 74 includes two hinge flanges 84 and a spring arm 88. The hinge flanges 84 extend orthogonally upward from the duct sealing region 82 and are located along the forward portion of the two outside edges of the door panel 74 that are adjacent to the inboard and outboard boundaries of the airflow duct 48. The hinge flanges 84 can be formed as an integral portion of the door panel 74 or, as shown in FIG. 6, can be separate angular brackets or extrusions connected to the door panel 74 by any suitable conventional method of fastening, e.g., rivets or screws. In any case, the hinge flanges 84 are pivotably attached to stationary structure within the flap 10 at a pivot point 90 so that the door panel 74 can be rotated from the closed position in which airflow duct 48 is closed off (FIG. 4) to the fully open position in which the duct sealing region 82 forms a portion of the foward wall of airflow duct (FIG. 5).

The spring arm 88 is angularly disposed relative to the rear surface of the door panel 74 and extends from the rearward edge of the door panel 74 to a point beyond the pivot point 90 so as to form a lever arm for activating the door panel 74. The retaining spring 76, which is a tension-type coil spring having a spring constant sufficient to retain the door panel 74 in the open position, is connected between the outer end of the spring arm 88 and stationary flap structure such as a rib 92. With this arrangement, the spring 76 is extended when the door panel 74 is held closed by closure arm 80 and exerts sufficient tension to securely hold the door panel 74 against the duct wall sealing flange 94 when the flap 10 is extended.

The closure arm 80 is an elongate member that is securely mounted to the flap support member 44 so as to extend downwardly into a small slot or opening 96 in the lower boundary 58 of flap recess 54. The portion of the closure arm 80 that extends through the opening 96 when the flap 10 is retracted (FIG. 4) is angularly disposed relative to the upper portion of the closure arm 80 such that the lower end of closure arm 80 contacts the door panel 74 as the flap 10 is retracted to rotate the door panel 74 about the pivot point 90 and securely hold the door panel 74 closed when the flap 10 is fully retracted. Since the flap 10 translates and rotates as it is extended or retracted, it is advantageous to utilize a roller constructed of rubber or other compliant material such as the roller 98 on the lower extremity of the closure arm 80. The roller 98 is connected to the closure arm 80 by a small pin or axle and is free to rotate about this axis so as to prevent abrasive contact of the closure arm 80 with the door panel 74.

As can be seen in FIGS. 4 and 5, the seal 78 is a tubular sealing strip constructed of rubber or other compliant material that maintains an airtight seal between the door panel 74 and the rear wall of the airflow duct 48 when the flap 10 is retracted, and maintains an air tight seal between the door panel 74 and a sealing flange 94 in the forward wall of the airflow duct 48 when the flaps are extended.

Figure 7:
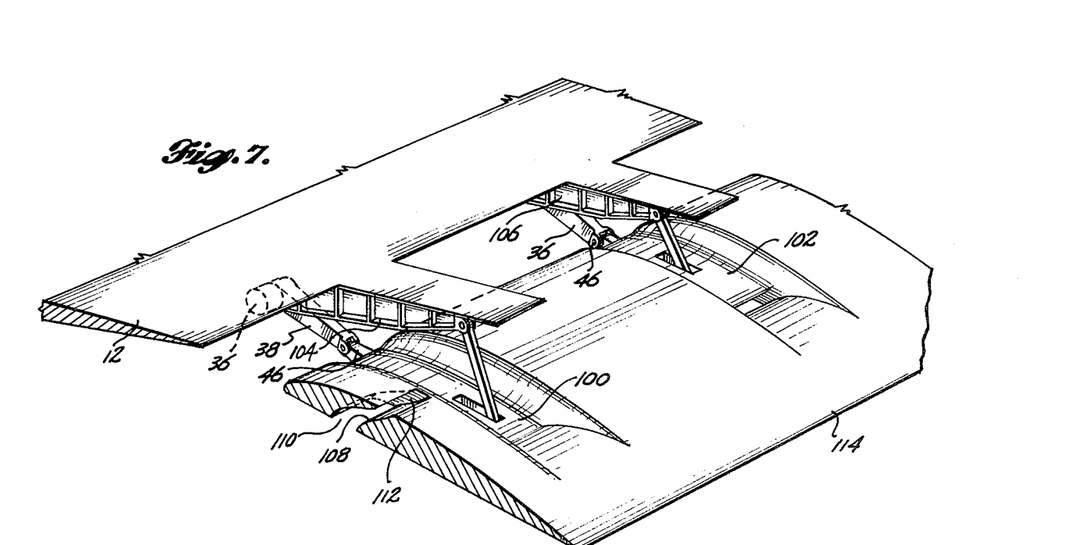
FIG. 7 is an isometric view of a wing and trailing edge flap arrangement that illustrates a second embodiment of this invention.

FIG. 7 depicts a second embodiment of this invention that is advantageously employed in a wing-flap arrangement in which the airflow through the slot formed between the wing and the flap does not flow substantially parallel to the flap support members. Such a situation often arises in swept wing aircraft or aircraft having wing structure in which the outboard portions of each wing are not perpendicular to the body section, but are angularly disposed rearwardly. For example, referring to FIG. 1, the outboard flap 18 does not translate streamwise relative to the air flowing parallel to the fuselage section 14, but translates chordwise such that airflow blockage resulting from the center support member 34 occurs outboard of and adjacent to the center support member 34. Accordingly, an airflow duct located in the flap recess for receiving the center support member 34 and an airflow channel located adjacent to the flap recess e.g. airflow duct 48 and airflow channel 50 of FIG. 2, will not satisfactorily compensate for the airflow blockage since the air discharged therefrom would not flow parallel to the air flowing across the upper flap surface.

As depicted in FIG. 7, such airflow blockage can be effectively compensated for by contouring the flap recess regions 100 and 102 that respectively receive and contain the flap center support member 104 and the inboard flap support member 106 when the flap 114 is retracted and by an airflow duct 108 having an inlet opening 110 in the lower surface of the flap or flap fairing and an outlet opening 112 in the upper flap surface at a position adjacent to and outboard of the center support member 104. The flap recesses 100 and 102 are configured in the same manner as the flap recess 54 of the embodiment of FIG. 2, with the sidewall boundaries and lower boundary of each recess being aerodynamically contoured to direct laminar airflow through the recessed region and across the adjoining portions of the upper flap surface. The airflow duct 108 is also generally configured in the same manner as the airflow duct 48 of the embodiment of FIG. 2, with the air inlet opening 110 being generally rectangular and of larger cross-sectional area than the rectangular outlet opening 112.

As can be seen in FIGS. 1 and 7, a rotary actuator 36, which activates the drive arm 38 to extend and retract the flap 114 is mounted beneath the wing 12 on the outboard surface of the center support member 104 in a position that intereferes with the desired placement of airflow duct 108. That is, the flap 114 cannot be fully retracted without the portion of the upper flap surface in which it is desirable to locate the airflow duct 108 striking the rotary actuator. Since the diameter of the rotary actuator 36 is generally significant relative to the thickness of the flap 114, the rotary actuator would also interfere with a closure door assembly such as the closure door depicted in FIGS. 2–6.

Figures 8, 9:
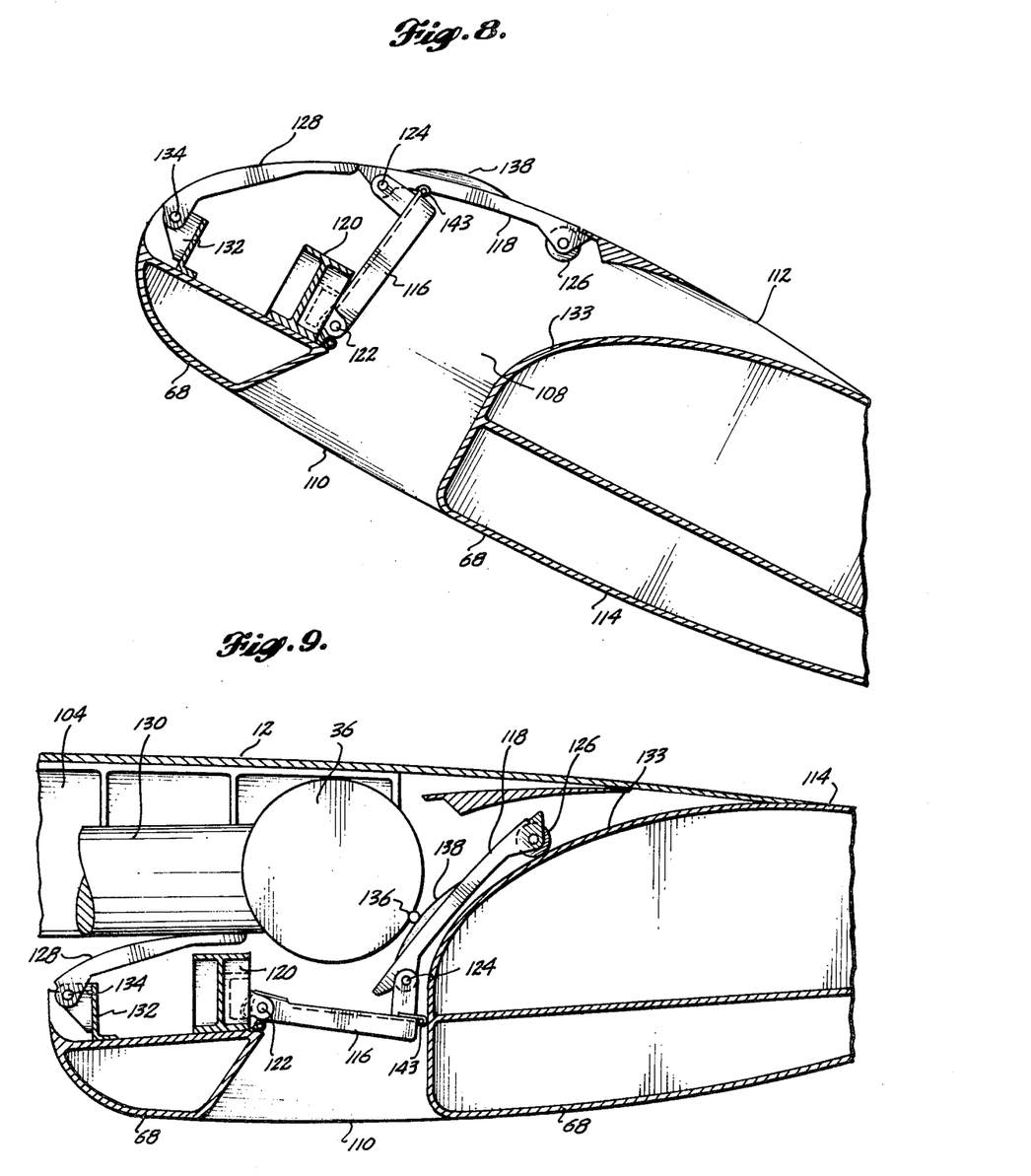
FIG. 8 is a cross-sectional side view of the airflow duct, the duct closure door and door actuation mechanism of the embodiment of this invention depicted in FIG. 7 that illustrates the door actuation mechanism and door configuration when the flap is extended.
FIG. 9 is a cross-sectional side view of the airflow duct and duct closure door of FIG. 8 when the flap is retracted.
Figure 10:
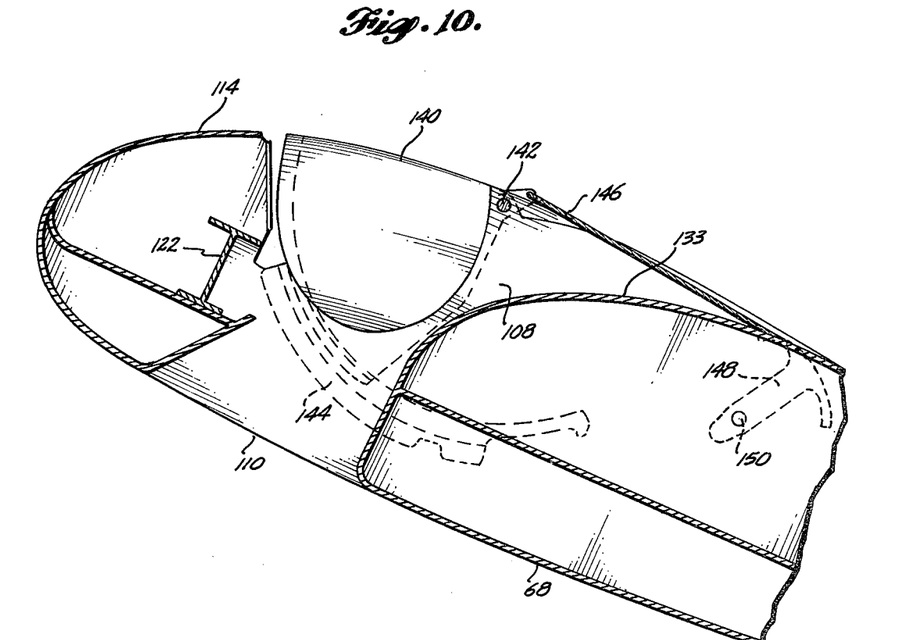
FIG. 10 is a fragmented cross-sectional side view of a rotatable sidewall door for use in the airflow duct of FIGS. 8 and 9 that illustrate the sidewall door when the flap is extended.

FIGS. 8 through 10 depict an airflow duct in accordance with this invention for use in a situation in which a structural member such as the rotary actuator 36 occupies a portion of the wing area into which the ducted region of the flap is retracted. Referring to FIG. 8, which depicts a cross-sectional view of the airflow duct 108 when the flaps are extended, it can be seen that a major portion of the forward wall of the duct 108 is formed by the lower surfaces of a duct closure panel 116 and an upper aft door panel 118. The closure panel 116 is a relatively flat metal sheet with the inboard and outboard edges bent downwardly to form orthogonal flanges. The forward end of the closure panel 116 is hinged to stationary flap structure such as a bracket 120 at a hinge point 122 by a hinge pin that passes through the closure panel flanges and an opening through the bracket 120. A torsion spring, located around the hinge pin, exerts a force tending to maintain the closure panel 116 in an upward orientation (FIG. 8). The closure panel 116 is dimensioned to extend over the full width of the airflow duct 108 and a portion of the aft edge of the closure panel 116 is formed upward at approximately a 90° angle and hinged to the forward end of the upper aft door panel 118.

The upper aft door panel 118 is a relatively flat metal sheet having the inboard and outboard edges thereof formed downward to form orthogonal flanges. A hinge pin 124 passes through the forward portion of the flanges to connect the upper aft door panel 118 to the closure panel 116 and a torsion spring located around the hinge pin exerts a force on the upper aft door panel 118 that tends to rotate the aft end of the door panel 118 upward. A small wheel-like roller 126, constructed of rubber or other compliant material, is mounted on the aft portion of each flange of the aft door panel 118 such that the surface of the roller extends below the edge of the flange. As shown in FIG. 8, when the flap 114 is extended, the torsion springs at the hinge points 122 and 124 position the closure panel 116 and the upper aft door panel 118 such that the lower surfaces of the closure panel and the upper aft door panel form a portion of the forward wall of the airflow duct 108 and the upper surface of the upper aft door panel 118 forms a portion of the upper surface of the flap 114.

As further depicted in FIG. 8, a forward door panel 128 forms a portion of the leading edge region of the flap 114 that is located immediately forward of the upper aft door panel 118. The forward door panel 128 is a panel contoured to match the contour of the flap 114 and is of a length commensurate with the dimensions of the structure that must be facilitated when flap 114 is retracted, e.g. the rotary actuator drive 130 of FIG. 9.

The forward door panel 128 is constructed similar to the closure panel 116 and the upper aft door 118 with the inboard and outboard edges thereof flanged downward. The forward end of each flange of forward door panel 128 is hinged to stationary flap structure such as a bracket 132. A hinge pin passes through each flange of the forward door panel 128 and through hinge point 134 of bracket 132. A torsion spring surrounding the hinge pin (not shown) exerts a force tending to maintain the forward door panel 128 in the position in which the upper surface of the door panel forms a portion of the leading edge of the flap 114 (FIG. 8).

As can be ascertained by examining FIGS. 8 and 9, as the flap 114 is retracted, a small compliant roller 136 mounted along the periphery of the rotary actuator 36 contacts an arcuate shaped contoured ramp 138 on the upper surface of the upper aft door panel 118 forcing the door panel 118 and the closure panel 116 to rotate about the hinge point 122 until the roller 126 contacts the aft wall surface 133 of the airflow duct 108. As retraction of the flap 114 continues, the upper aft door panel 118 is forced to rotate about the hinge point 124 while the closure panel 116 continues to rotate about the hinge point 122. When the flap 114 is fully retracted (FIG. 9), the closure panel 116 closes off the airflow duct 108 at the boundary between the flap 114 and the flap fairing 68.

As shown in FIGS. 8 and 9, a seal 143 such as a tubular rubber strip, is mounted along the aft edge of the closure panel 116 to form an airtight seal between the closure panel 116 and aft duct wall 133 of the airflow duct 108. As can be further ascertained from FIGS. 8 and 9, as the flap 114 is retracted, the rotary actuator drive 130 contacts the aft portion of the forward door 128, forcing the door to rotate about the hinge point 134 such that the forward door 128 does not interfere with the stowage of the rotary actuator drive 130 when the flap 114 is fully retracted.

Figure 11:
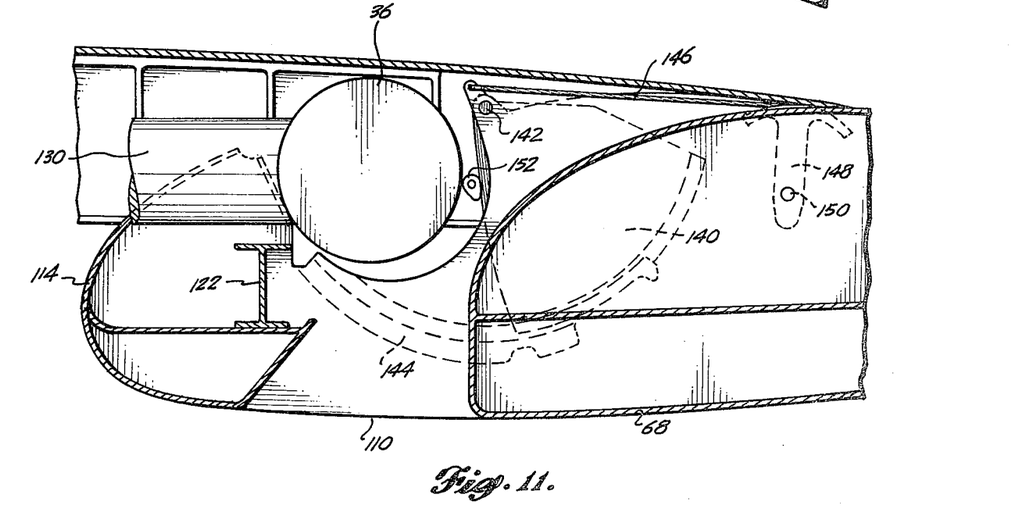
FIG. 11 is a fragmented cross-sectional side view of the sidewall door of FIG. 10 when the flap is retracted.

FIGS. 10 and 11 depict an arrangement of the inboard sidewall of duct 108 that provides clearance for the rotary actuator 36 when the flap 114 is retracted. In FIGS. 10 and 11, a sliding sidewall panel 140, which is generally triangular in shape, is hinged about a point 142 near the apex of the triangular shaped sidewall panel to a point on the inboard wall of airflow duct 108 near the upper surface of flap 114. The sidewall panel 140 is formed to define a protruding ridge along the lower edge thereof that fits in a groove in a door guide 144.

The door guide 144, which is securely mounted on the inboard side of the inboard airflow duct wall, is an elongated arcuate shaped member including a groove that effectively forms a track for the protruding ridge on the sidewall panel 140. As can be seen in FIGS. 10 and 11, the sidewall panel 140 swings through an arc about the hinge point 142 to provide clearance for the rotary actuator 36 as the flap 114 is retracted, with the ridge of the sidewall panel 140 sliding along the groove in door guide 144.

The sidewall panel 140 is held in the closed position when flaps are extended (FIG. 10) by a cable 146 and a drive quadrant 148. The drive quadrant 148 is generally located on the outboard wall of the flap recess 100 (FIG. 7) at a point aft of the exit opening 112 of the airflow duct 108, and is pivotably attached to the recess wall by a torsion spring at a hinge point 150 near the center point of the quadrant. One end of the cable 146 is connected to the forward outer extremity of the drive quadrant 148 and the second end of the cable 146 is attached to the apex of the sidewall panel 140. As the flap 114 is retracted, small cam 152, mounted on the center support member 104 so as to contact the forward edge of the sidewall panel 140 before the sidewall panel 140 strikes the rotary actuator 36, forces the sidewall panel 140 to rotate about the hinge point 142. As the sidewall panel 140 rotates downwardly and rearwardly about the hinge point 142, tension is exerted on the cable 146 forcing the drive quadrant 148 to rotate about the hinge point 150 against the restoring force exerted by the torsion hinge. With the flap 114 fully retracted (FIG. 11), the drive quadrant 148 is rotated such that the quadrant upper edge is substantially tangential to the upper surface of the flap 114 and the torsion hinge is stressed to supply adequate force to restore the sidewall panel 140 to the closed position when the flaps are extended. Thus as the flaps are extended, the torsion hinge forces the drive quadrant 148 to rotate rearwardly about the hinge point 150, pulling the cable 146, which in turn causes the sidewall panel 140 to rotate about the hinge point 142 until the sidewall panel is fully closed (FIG. 10). With the flaps extended, the sidewall panel 140 is maintained in a closed position by tension in cable 146 caused by residual torque exerted by the quadrant torsion hinge.

It will be realized by those skilled in the art the embodiments herein discussed are exemplary in nature, describing embodiments of this invention for use in situations in which a wing-flap arrangement permits relatively uncontrained practice of this invention, and embodiments for use in situations in which either the flap structure or the wing configuration constrains the configuration of an airflow duct constructed in accordance with this invention. Accordingly, it will be recognized that many structural variations are possible without exceeding the scope and spirit of this invention. For example, although this invention has been described in the context of compensating for airflow blockage caused by support members between a wing and a single flap, the invention can be utilized for similar blockage due to a support member between two flap members of a multiple slot flap arrangement, i.e., an arrangement in which a wing and a serially-connected plurality of flaps are deployable relative to one another to form airflow slots between adjoining elements. In any case, it can be recognized that each embodiment of this invention includes an airflow duct between the upper and lower surfaces of a flap to direct air across a portion of the upper flap surface that is at least partially blocked from receiving air flowing from the airflow slot formed between the flap and a forward mounted airfoil, such as a wing.

What is claimed is:

1. In an airplane flap assembly including a flap having an upper surface and a lower surface and an airplane wing wherein said flap is attached to said wing by at least one support means, said flap being positionable relative to said wing to define an airflow slot between said wing and the upper surface of said flap for directing air over the upper surface of said flap, said flap being retractable to define a substantially continuous aerodynamic surface with said airplane wing, said flap including a first recess in the upper surface thereof, said first recess extending rearwardly from the leading edge of said flap for receiving a portion of said support means when said flap is retracted, an improvement to compensate for the blockage of airflow caused by said support means over a region of the upper surface of said flap contiguous to said support means, said improvement comprising:

an airflow duct of predetermined cross-sectional area, said airflow duct including an air inlet opening in the lower surface of said flap in communication with an air outlet opening positioned to direct air over said blocked airflow region of said upper flap surface; and means defining a second recess in a portion of said upper surface of said flap, said second recess being immediately adjacent and substantially parallel to said first recess, the boundary surfaces of said first and second recesses being contoured to form aerodynamically smooth surfaces for directing airflow to said blocked airflow region on the upper surface of said flap is positioned to define said airflow slot between said wing and said upper surface of said flap.

2. The improvement of claim 1, further comprising a pivotable cove panel for covering said second recess when said flap is in the retracted position, said pivotable cove panel being pivotably connected to the upper surface of said airplane wing, said cove panel swinging downwardly about said pivotable connection when said flap is extended to define an airflow slot between the trailing edge of said cove panel and the lower boundary surface of said second recess for regulating airflow through said second recess.

3. The improvement of claim 2, wherein said air outlet opening of said airflow duct is located immediately aft of said support member.

4. The improvement of claim 1, further comprising a door means for closing said inlet opening of said air flow duct when said flap is in its retracted position.

5. The improvement of claim 4 wherein said door means includes means for forming a portion of said airflow duct when said flap is in its extended position.

6. The improvement of claim 5, wherein said door means further includes means for forming a portion of the upper surface of said flap when said flap is in its retracted position.

7. The improvement of claim 6, further comprising a rotatable sidewall for forming one sidewall of said airflow duct when said flap is in an extended position, said sidewall hinged about a predetermined point on the upper surface of said flap, said sidewall rotating into the interior region of said flap when said flap is retracted.

8. In an airplane flap having an upper surface and a lower surface, said flap being attachable to an airplane wing by at least one flap support member extending rearwardly from said wing such that said flap is extendable from said airplane wing to define a spanwise slot between said wing and the upper surface of said flap for directing airflow across the upper surface of said flap, said flap being retractable to define a continuous aerodynamic surface with said wing, said upper surface of said flap including a first recess extending a predetermined distance from the leading edge of said flap toward the trailing edge of said flap for receiving and containing said flap support member when said flap is retracted, the improvement comprising:

an airflow duct having an air inlet located in the lower surface of said flap and an air outlet located across the terminating portion of said first recess; and a rampway for directing an airstream flowing from said airflow duct air outlet to a portion of the upper surface of said flap aft of said first recess, said rampway defining an inclined surface between the aft edge of said airflow duct outlet and said portion of said upper surface of said flap, said airflow duct and said rampway directing said airstream across said portion of said upper flap surface aft of said recess to compensate for airflow blockage caused by said flap support member.

9. The improvement of claim 8 further comprising means defining a second recess for directing additional airflow across the upper surface of said flap, said second recess located contiguous to said first recess, said second recess extending from the leading edge of said flap for a predetermined distance toward the trailing edge thereof, said second recess of decreasing depth relative to the direction of said airflow, said first and second recesses contoured to direct the airstream through said airflow duct to that portion of said flap upper surface located aft of said first and second recesses for maintaining laminar airflow across said portion of said flap upper surface aft of said first and second recesses.

10. The improved flap of claim 9 further comprising a closure door for sealing said air inlet when said flap is retracted.

11. The improved flap of claim 10, wherein said closure door defines a portion of the wall surface of said airflow duct when said flap is extended.

12. In an airplane flap assembly including a flap having an upper surface and a lower surface and an airplane wing wherein said flap is attached to extend spanwise along the trailing edge of said wing by at least one support means that extends between said wing and said flap, said flap being positionable relative to said wing to define a spanwise airflow slot between said wing and the upper surface of said flap for directing air over the upper surface of said flap with said slot extending for substantially the full spanwise dimension of said flap and said support means being disposed in the airstream directed through said airflow slot, said flap being retractable to define a substantially continuous aerodynamic surface with said airplane wing, said upper surface of said flap including a recessed region extending rearwardly from the leading edge of said flap to an aft terminating edge located forwardly of the trailing edge of said flap, said recessed region for receiving at least a portion of said support means when said flap is retracted, wherein the improvement comprises airflow means for directing a stream of air to a predetermined rearwardly extending portion of said upper surface of said flap that is contiguous to said support means to compensate for airflow blockage through a portion of said slot between said flap and said wing that is caused by disposing said support means in said airflow slot, said airflow means including:

a rampway for directing that portion of the airflow which passes through said slot and into said recessed region of said flap upper surface upwardly and rearwardly for passage across a first portion of said upper surface of said flap that is located aft of said recessed region, said rampway defining an aerodynamically smooth inclined surface between said aft terminating edge of said recessed region and said first portion of said upper surface of said flap; and an airflow duct extending between an air inlet opening in the lower surface of said flap and an air outlet opening in the upper surface of said flap, said air inlet opening being located rearwardly of said flap leading edge and having a spanwise dimension substantially less than the spanwise dimension of said flap, said air outlet opening being located outboard of and substantially adjacent to said recessed region at a position intermediate to said leading edge of said flap and said aft terminating edge of said recessed region, said outlet opening having a spanwise dimension substantially less than the spanwise dimension of said flap, said airflow duct being configured and arranged to discharge the airstream passing through said airflow duct for rearward flow along at least a portion of said predetermined region of said flap upper surface in which said airflow blockage occurs, said airflow duct and said rampway being further configured and arranged for supplying airflow of sufficient volume and velocity to cause the combined airflow provided to said blocked airflow region by said airflow duct and by said airflow slot to energize a boundary layer of air along said blocked airflow region of said upper surface of said flap.

13. The improvement of claim 12, further comprising a door means for closing said inlet opening of said airflow duct when said flap is in its retracted position.

14. The improvement of claim 13 wherein said door means includes means for forming a portion of said airflow duct when said flap is in its extended position.

15. The improvement of claim 14, wherein said door means further includes means for forming a portion of the upper surface of said flap when said flap is in its retracted position.

16. The improvement of claim 15, further comprising a rotatable sidewall for forming one sidewall of said airflow duct when said flap is in an extended position, said sidewall hinged about a predetermined point on the upper surface of said flap, said sidewall rotating into the interior region of said flap when said flap is retracted.

* * * * *